US011961446B2

(12) United States Patent
He

(10) Patent No.: US 11,961,446 B2
(45) Date of Patent: Apr. 16, 2024

(54) DISPLAY DRIVING METHOD AND DEVICE, AND DISPLAY DEVICE

(71) Applicant: Shenzhen China Star Optoelectronics Semiconductor Display Technology Co., Ltd., Guangdong (CN)

(72) Inventor: Jhenwei He, Guangdong (CN)

(73) Assignee: SHENZHEN CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 31 days.

(21) Appl. No.: 17/800,237

(22) PCT Filed: Jun. 30, 2022

(86) PCT No.: PCT/CN2022/102580
§ 371 (c)(1),
(2) Date: Aug. 17, 2022

(65) Prior Publication Data

US 2023/0410715 A1 Dec. 21, 2023

(30) Foreign Application Priority Data

Jun. 15, 2022 (CN) ....................... 2022110677406.8

(51) Int. Cl.
*G09G 3/20* (2006.01)

(52) U.S. Cl.
CPC ... *G09G 3/2074* (2013.01); *G09G 2310/0254* (2013.01); *G09G 2320/0209* (2013.01); *G09G 2320/0666* (2013.01); *G09G 2360/06* (2013.01)

(58) Field of Classification Search
CPC ......... G09G 3/2074; G09G 2310/0254; G09G 2320/0209; G09G 2320/0666; G09G 2360/16
See application file for complete search history.

(56) References Cited

U.S. PATENT DOCUMENTS

2014/0232624 A1 8/2014 Kim
2022/0319455 A1* 10/2022 He ....................... G09G 3/3607
2023/0105393 A1* 4/2023 Fu ............................ G09G 5/02
382/167

FOREIGN PATENT DOCUMENTS

CN 102347013 2/2012
CN 105845066 4 8/2016
CN 112530344 A 3/2021
(Continued)

OTHER PUBLICATIONS

International Search Report in International application No. PCT/CN2022/102580,dated Dec. 27, 2022.
(Continued)

*Primary Examiner* — Kenneth B Lee, Jr.
(74) *Attorney, Agent, or Firm* — Mark M. Friedman

(57) ABSTRACT

The present application discloses a display driving method and device, and a display device, by obtaining Gaussian probability of a preset scene in a to-be-displayed image with respect to a preset color, comparing the Gaussian probability with a predetermined threshold, and setting the polarities of sub-pixels, the driving method of the present application reduces the risk of crosstalk caused by the fact that the voltage drops of the coupling capacitance on the adjacent data lines cannot be canceled each other out.

20 Claims, 9 Drawing Sheets

(56) References Cited

FOREIGN PATENT DOCUMENTS

| | | | |
|---|---|---|---|
| CN | 112540486 | A | 3/2021 |
| CN | 112907457 | A | 6/2021 |
| CN | 113741107 | A | 12/2021 |

OTHER PUBLICATIONS

Written Opinion of the International Search Authority in International application No. PCT/CN2022/102580,dated Dec. 27, 2022.

* cited by examiner (a)

(b)

DISPLAY DRIVING METHOD AND DEVICE, AND DISPLAY DEVICE

FIELD OF THE DISCLOSURE

The present application relates to display technology, and more particularly to a display driving method and device, and a display device.

DESCRIPTION OF RELATED ARTS

With the development of technology, the resolution of display panels has been gradually improved. At present, the resolution of display panels has reached up to 8K (with a resolution of 7680×4320). Under the condition that the size of display panels is fixed, the improvement of resolution brings an effect of reduced aperture ratio, thereby reducing the light transmittance of display panels. Therefore, the display panels using an 8-domain pixel electrode structure to improve viewing angle cannot be applied in high resolution products because of the loss of light transmittance. Instead, a 4-domain pixel electrode structure is used for the display panels. However, the display panels with the 4-domain pixel electrode structure will have a degraded viewing angle. Therefore, the display panels with the 4-domain pixel electrode structure needs a compensation for viewing angle to improve the viewing angle performance.

In viewing angle compensation, a general way is to use a plurality of sub-pixels to form a grayscale pixel group. The grayscale pixel group includes a high-grayscale sub-pixel and a low-grayscale sub-pixel. With the grayscale pixel groups, the display effect resulted at oblique viewing angles can be improved. In an existing sub-pixel array structure for viewing angle compensation, each column of sub-pixels is provided with a data line, and the sub-pixels on each column of sub-pixels are connected to the same data line. In some viewing angle compensation approaches, in order to reduce flicker on the screen, adjacent data lines are set to have the same polarity in some arrangements. Therefore, the adjacent data lines will have repeated polarities such as "positive, positive" and "negative, negative". Because the voltage drops of the coupling capacitance on the adjacent data lines in the afore-mentioned two cases cannot be canceled each other out, a high risk of crosstalk in the column direction is resulted.

Technical Problems

The present application provides a display driving method and device of a display device, and a display device, so as to improve the problem of crosstalk risk caused by the fact that the voltage drops of the coupling capacitors on adjacent data lines cannot cancel each other.

Technical Solutions

The present application provides a display driving method for a display device, the display device including:

a plurality of sub-pixels arranged in an array;

a plurality of data lines, each column of the sub-pixels corresponding to and connecting to one data line, and adjacent data lines having one column of the sub-pixels disposed therebetween; and a plurality of grayscale pixel groups, each of the grayscale pixel groups including sub-pixels 10 of a 2N×3M matrix, where N and M are positive integers, the display driving method including the following steps:

obtaining a first to-be-processed chroma dataset and a second to-be-processed chroma dataset of a preset scene in a to-be-displayed image with respect to a preset color;

obtaining Gaussian probability of the preset scene in the to-be-displayed image with respect to the preset color according to the first to-be-processed chroma dataset and the second to-be-processed chroma dataset;

when the Gaussian probability is greater than or equal to a predetermined threshold, setting polarities of the sub-pixels in adjacent columns of each grayscale pixel group to be opposite to each other, setting the polarities of the sub-pixels adjacent to the grayscale pixel group in a row direction to be symmetrical to the polarities of the sub-pixels of the grayscale pixel group, and then displaying the to-be-displayed image; and when the Gaussian probability is less than the predetermined threshold, setting the polarities of the sub-pixels in adjacent columns to be opposite to each other, and then displaying the to-be-displayed image.

Optionally, in some embodiments of the present application, before the step of obtaining the Gaussian probability of the preset scene in the to-be-displayed image with respect to the preset color according to the first to-be-processed chroma dataset and the second to-be-processed chroma dataset, the method further includes:

obtaining a first initial chroma dataset and a second initial chroma dataset of the preset scene in preprocessed images with respect to the preset color; and creating a Gaussian model for the preset color according to the first initial chroma dataset and the second initial chroma dataset, wherein the step of obtaining the Gaussian probability of the preset scene in the to-be-displayed image with respect to the preset color according to the first to-be-processed chroma dataset and the second to-be-processed chroma dataset includes:

obtaining the Gaussian probability of the preset scene in the to-be-displayed image with respect to the preset color from the Gaussian model, according to the first to-be-processed chroma dataset and the second to-be-processed chroma dataset.

Optionally, in some embodiments of the present application, the step of obtaining the first initial chroma dataset and the second initial chroma dataset of the preset scene in the preprocessed images with respect to the preset color includes:

obtaining a plurality of the preprocessed images containing the preset scene; and extracting color data of the preset scene in any of the preprocessed images with respect to the preset color to obtain the first initial chroma dataset and the second initial chroma dataset.

Optionally, in some embodiments of the present application, the step of creating the Gaussian model for the preset color according to the first initial chroma dataset and the second initial chroma dataset includes:

obtaining mean values of the first initial chroma dataset and the second initial chroma dataset respectively;

obtaining a covariance matrix of the first initial chroma dataset and the second initial chroma dataset, an inverse of the covariance matrix and a rank of the covariance matrix; and creating the Gaussian model according to the covariance matrix, the inverse of the covariance matrix and the rank of the covariance matrix.

Optionally, in some embodiments of the present application, the step of obtaining the Gaussian probability of the preset scene in the to-be-displayed image with respect to the preset color from the Gaussian model, according to the first to-be-processed chroma dataset and the second to-be-processed chroma dataset includes:

determining whether the to-be-displayed image contains the preset scene;

assigning a coefficient value for a correlation to the preset scene in the to-be-displayed image, according to the determination on whether the to-be-displayed image contains the preset scene;

for any one of the preset colors of the preset scenes in the to-be-displayed image, obtaining an initial probability for the preset color from the Gaussian model according to the first to-be-processed chroma dataset and the second to-be-processed chroma dataset;

obtaining the Gaussian probability of the preset scene in the to-be-displayed image with respect to the preset color according to the initial probability and the correlation coefficient.

Optionally, in some embodiments of the present application, there are multiple preset scenes and multiple preset colors, wherein for any one of the preset scenes, the initial probability of the preset color of the preset scene is corrected using the correlation coefficient, wherein the Gaussian probability of the multiple preset colors of the multiple preset scenes in the to-be-displayed image is obtained by calculating a sum of the initial probabilities, corrected using the correlation coefficients, of the multiple preset colors of the multiple preset scenes in the to-be-displayed image.

Optionally, in some embodiments of the present application, the sub-pixels of adjacent rows of each grayscale pixel group includes high-grayscale sub-pixels and low-grayscale sub-pixels.

Optionally, in some embodiments of the present application, the sub-pixels of each grayscale pixel group along a row direction are arranged in an alternate manner with high grayscale and low grayscale.

Optionally, in some embodiments of the present application, the sub-pixels of each grayscale pixel group along adjacent rows include first row-sub-pixels and second row-sub-pixels, and the first row-sub-pixels are low-grayscale sub-pixels, and the second row-sub-pixels are high-grayscale sub-pixels.

Optionally, in some embodiments of the present application, each grayscale pixel group includes sub-pixels in a 2×6 matrix and an arrangement of the sub-pixels of each grayscale pixel group along a row direction is as flows: "high grayscale, low grayscale, high grayscale, low grayscale, high grayscale and low grayscale".

Correspondingly, the present application provides a display driving device for a display device, the display device including:

a plurality of sub-pixels arranged in an array;

a plurality of data lines, each column of the sub-pixels corresponding to and connecting to one data line, and adjacent data lines having one column of the sub-pixels disposed therebetween; and a plurality of grayscale pixel groups, each of the grayscale pixel groups including sub-pixels 10 of a 2N×3M matrix, where N and M are positive integers, the display driving device including:

a data obtaining module, configured to obtain a first to-be-processed chroma dataset and a second to-be-processed chroma dataset of a preset scene in a to-be-displayed image with respect to a preset color;

a data processing module, configured to obtain Gaussian probability of the preset scene in the to-be-displayed image with respect to the preset color according to the first to-be-processed chroma dataset and the second to-be-processed chroma dataset; and a comparison driving module, configured to compare the Gaussian probability with a predetermined threshold, when the Gaussian probability is greater than or equal to the predetermined threshold, set polarities of the sub-pixels in adjacent columns of each grayscale pixel group to be opposite to each other, set the polarities of the sub-pixels adjacent to the grayscale pixel group in a row direction to be symmetrical to the polarities of the sub-pixels of the grayscale pixel group, and then display the to-be-displayed image;

when the Gaussian probability is less than the predetermined threshold, set the polarities of the sub-pixels in adjacent columns to be opposite to each other, and then display the to-be-displayed image.

Correspondingly, the present application further provides a display device, including a processor, a storage and a computer program stored in the storage and executable on the processor, wherein the processor executes the computer program to implement steps of a display driving method for the display device, the display device including:

a plurality of sub-pixels arranged in an array;

a plurality of data lines, each column of the sub-pixels corresponding to and connecting to one data line, and adjacent data lines having one column of the sub-pixels disposed therebetween; and a plurality of grayscale pixel groups, each of the grayscale pixel groups including sub-pixels 10 of a 2N×3M matrix, where N and M are positive integers, the display driving method including the following steps:

obtaining a first to-be-processed chroma dataset and a second to-be-processed chroma dataset of a preset scene in a to-be-displayed image with respect to a preset color;

obtaining Gaussian probability of the preset scene in the to-be-displayed image with respect to the preset color according to the first to-be-processed chroma dataset and the second to-be-processed chroma dataset;

when the Gaussian probability is greater than or equal to a predetermined threshold, setting polarities of the sub-pixels in adjacent columns of each grayscale pixel group to be opposite to each other, setting the polarities of the sub-pixels adjacent to the grayscale pixel group in a row direction to be symmetrical to the polarities of the sub-pixels of the grayscale pixel group, and then displaying the to-be-displayed image; and when the Gaussian probability is less than the predetermined threshold, setting the polarities of the sub-pixels in adjacent columns to be opposite to each other, and then displaying the to-be-displayed image.

Optionally, in some embodiments of the present application, before the step of obtaining the Gaussian probability of the preset scene in the to-be-displayed image with respect to the preset color according to the first to-be-processed chroma dataset and the second to-be-processed chroma dataset, the method further includes:

obtaining a first initial chroma dataset and a second initial chroma dataset of the preset scene in preprocessed images with respect to the preset color; and creating a Gaussian model for the preset color according to the first initial chroma dataset and the second initial chroma dataset, wherein the step of obtaining the Gaussian probability of the preset scene in the to-be-displayed image with respect to the preset color according to the first to-be-processed chroma dataset and the second to-be-processed chroma dataset includes:

obtaining the Gaussian probability of the preset scene in the to-be-displayed image with respect to the preset color from the Gaussian model, according to the first to-be-processed chroma dataset and the second to-be-processed chroma dataset.

Optionally, in some embodiments of the present application, the step of obtaining the first initial chroma dataset and the second initial chroma dataset of the preset scene in the preprocessed images with respect to the preset color includes:

obtaining a plurality of the preprocessed images containing the preset scene; and extracting color data of the preset scene in any of the preprocessed images with respect to the preset color to obtain the first initial chroma dataset and the second initial chroma dataset.

Optionally, in some embodiments of the present application, the step of creating the Gaussian model for the preset color according to the first initial chroma dataset and the second initial chroma dataset includes:

obtaining mean values of the first initial chroma dataset and the second initial chroma dataset respectively;

obtaining a covariance matrix of the first initial chroma dataset and the second initial chroma dataset, an inverse of the covariance matrix and a rank of the covariance matrix; and creating the Gaussian model according to the covariance matrix, the inverse of the covariance matrix and the rank of the covariance matrix.

Optionally, in some embodiments of the present application, the step of obtaining the Gaussian probability of the preset scene in the to-be-displayed image with respect to the preset color from the Gaussian model, according to the first to-be-processed chroma dataset and the second to-be-processed chroma dataset includes:

determining whether the to-be-displayed image contains the preset scene;

assigning a coefficient value for a correlation to the preset scene in the to-be-displayed image, according to the determination on whether the to-be-displayed image contains the preset scene;

for any one of the preset colors of the preset scenes in the to-be-displayed image, obtaining an initial probability for the preset color from the Gaussian model according to the first to-be-processed chroma dataset and the second to-be-processed chroma dataset;

obtaining the Gaussian probability of the preset scene in the to-be-displayed image with respect to the preset color according to the initial probability and the correlation coefficient.

Optionally, in some embodiments of the present application, there are multiple preset scenes and multiple preset colors, wherein for any one of the preset scenes, the initial probability of the preset color of the preset scene is corrected using the correlation coefficient, wherein the Gaussian probability of the multiple preset colors of the multiple preset scenes in the to-be-displayed image is obtained by calculating a sum of the initial probabilities, corrected using the correlation coefficients, of the multiple preset colors of the multiple preset scenes in the to-be-displayed image.

Optionally, in some embodiments of the present application, the sub-pixels of adjacent rows of each grayscale pixel group includes high-grayscale sub-pixels and low-grayscale sub-pixels.

Optionally, in some embodiments of the present application, the sub-pixels of each grayscale pixel group along a row direction are arranged in an alternate manner with high grayscale and low grayscale.

Optionally, in some embodiments of the present application, the sub-pixels of each grayscale pixel group along adjacent rows include first row-sub-pixels and second row-sub-pixels, and the first row-sub-pixels are low-grayscale sub-pixels, and the second row-sub-pixels are high-grayscale sub-pixels.

Beneficial Effects

The present application provides a display driving method and device, and a display device. The display driving method includes the following steps: obtaining a first to-be-processed chroma dataset and a second to-be-processed chroma dataset of a preset scene in a to-be-displayed image with respect to a preset color; obtaining Gaussian probability of the preset scene in the to-be-displayed image with respect to the preset color according to the first to-be-processed chroma dataset and the second to-be-processed chroma dataset; when the Gaussian probability is greater than or equal to a predetermined threshold, setting polarities of the sub-pixels in adjacent columns of each grayscale pixel group to be opposite to each other, setting the polarities of the sub-pixels adjacent to the grayscale pixel group in a row direction to be symmetrical to the polarities of the sub-pixels of the grayscale pixel group, and then displaying the to-be-displayed image; and when the Gaussian probability is less than the predetermined threshold, setting the polarities of the sub-pixels in adjacent columns to be opposite to each other, and then displaying the to-be-displayed image. By obtaining the Gaussian probability of the preset scene in the to-be-displayed image with respect to the preset color, comparing the Gaussian probability with the predetermined threshold, and determining whether to perform the viewing angle compensation on the to-be-displayed image based on the comparison result, the present application reduces the risk of crosstalk caused by the fact that the voltage drops of the coupling capacitance on the adjacent data lines cannot be canceled each other out.

DESCRIPTION OF DRAWINGS

For explaining the technical solutions used in the embodiments of the present application more clearly, the appended figures to be used in describing the embodiments will be briefly introduced in the following. Obviously, the appended figures described below are only some of the embodiments of the present application, and those of ordinary skill in the art can further obtain other figures according to these figures without making any inventive effort.

DESCRIPTION OF EMBODIMENTS OF THE DISCLOSURE

Figure 1:
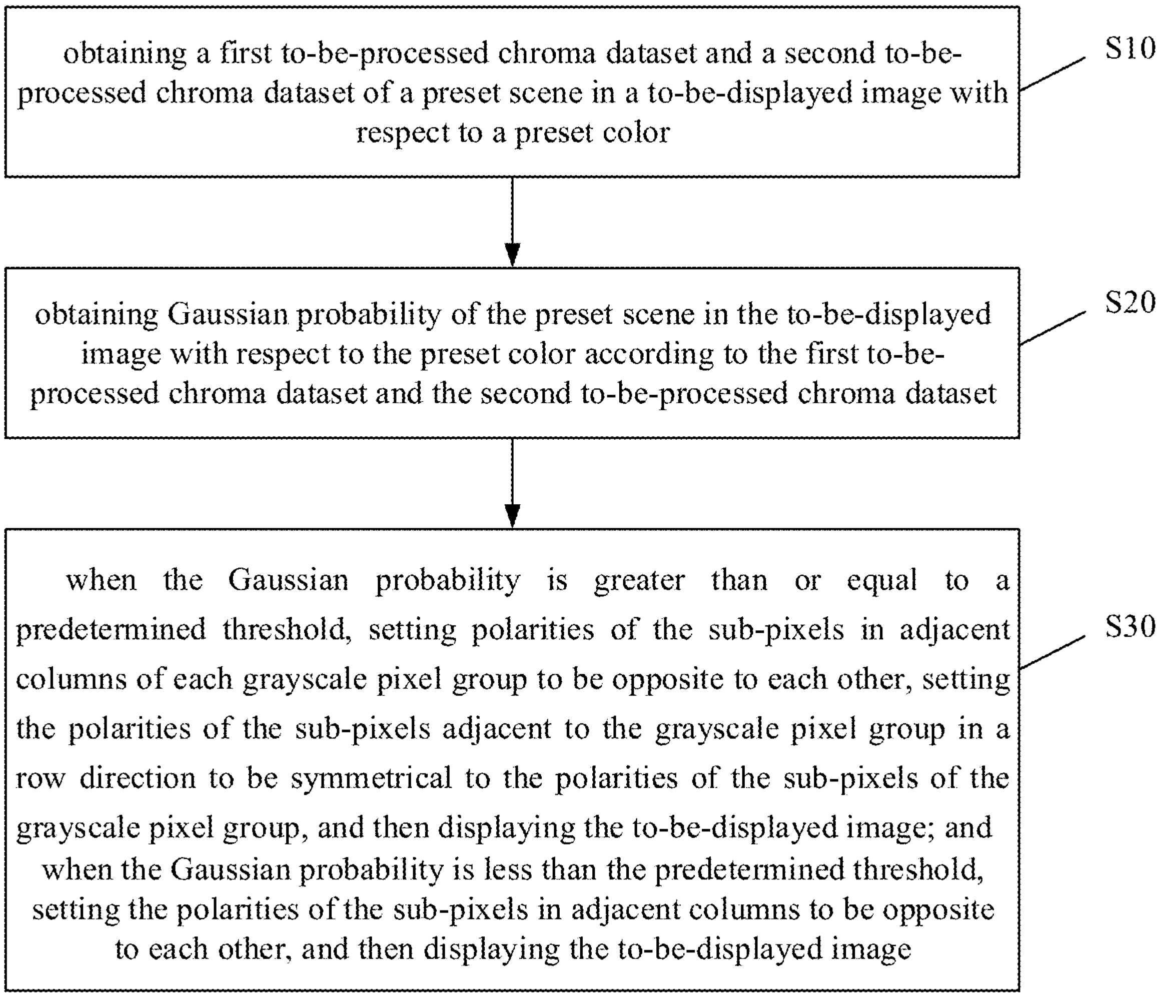
FIG. 1 is a flowchart of a display driving method for a display device according to a first embodiment of the present application.

The technical solutions in the embodiments of the present application are clearly and completely described below with reference to appending drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application.

In the description of the present application, it is to be understood that the terms "center", "longitudinal", "lateral", "length", "width", "thickness", "upper", "lower", "front", "rear", "left", "right", "vertical", "horizontal", "top", "bottom", "inner", "outer", and the like indicated orientation or positional relationship are based on the relationship of the position or orientation shown in the drawings, which is only for the purpose of facilitating description of the present application and simplifying the description, but is not intended to or implied that the device or element referred to must have a specific orientation, and be constructed and operated in a particular orientation. Therefore, it should not be construed as a limitation of the present disclosure. In addition, the terms "first" and "second" are used for descriptive purposes only, and should not be taken to indicate or imply relative importance, or implicitly indicate the indicated number of technical features. Thus, by defining a feature with "first" or "second" may explicitly or implicitly include one or more features. In the description of the present application, "a plurality" means two or more unless explicitly defined.

The word "exemplary" is used herein to mean "serving as an example, instance, or illustration." Any embodiment described herein as "exemplary" is not necessarily to be construed as preferred or advantageous over other embodiments. The following description is provided in order to implement and utilize the present application by those of ordinary skill in the art. Details are also provided below for the purpose of explanation. It should be understood that those of ordinary skill in the art can be acknowledged that the present application is also achievable without these specific details. In other examples, well-known structures and processes will not be detailedly described in order not to render the description of the present application obscure by unnecessary details. Therefore, the present application is not intended to be limited to the illustrated embodiments, but is to be consistent with the widest range covered by the disclosed principles and features of the present application. Unless otherwise specified, the orientations including parallel or vertical involved in this application are not directed to parallel or vertical in a strict sense, as long as the corresponding structure can achieve its purpose.

The present application provides a display driving method and device, and a display device, which will be described in detail below. It needs to note that the order in describing the following embodiments is not intended to be treated as an order of preferred embodiments.

Figure 2:
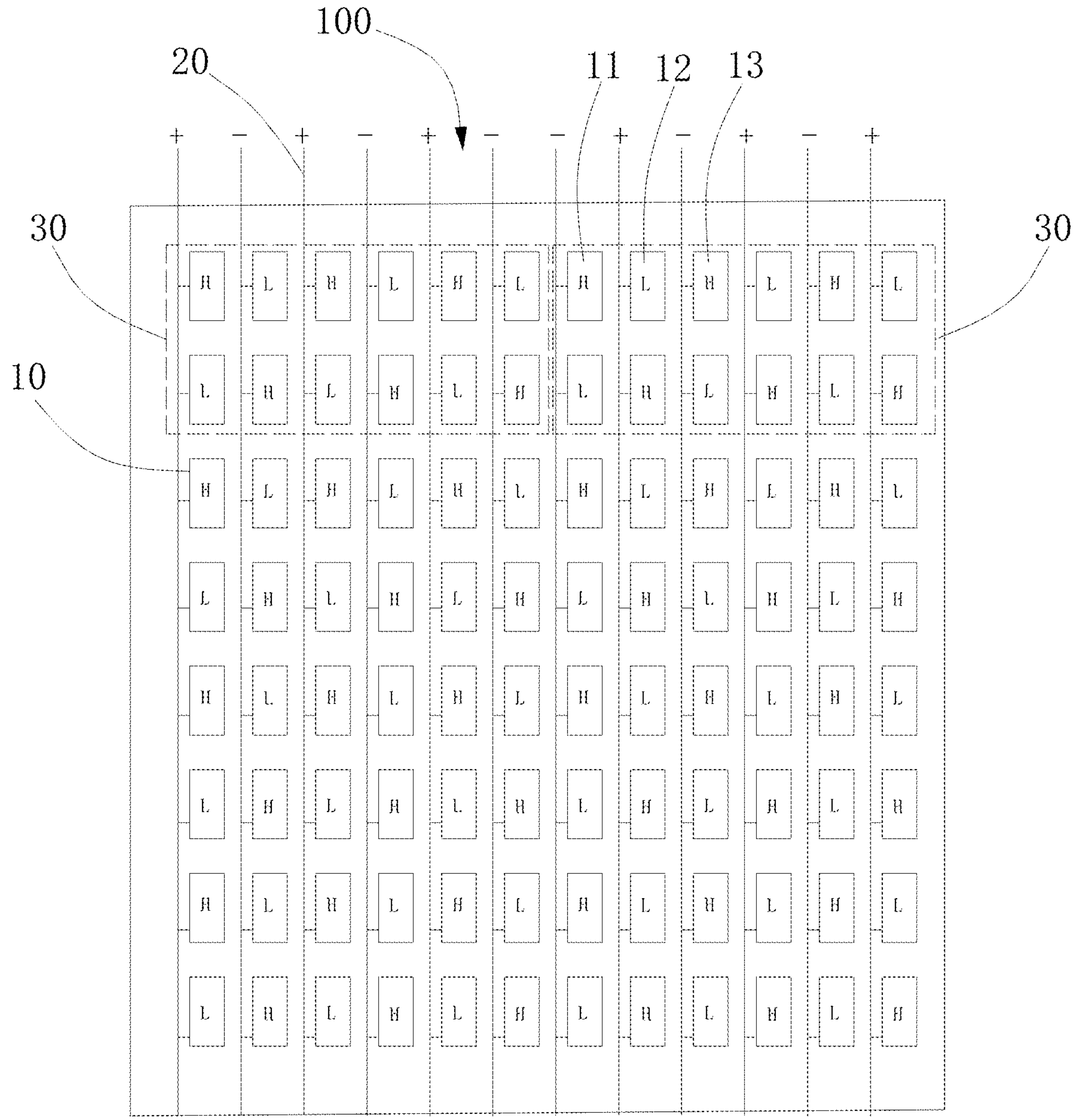
FIG. 2 is a schematic diagram illustrating a first structure of a display device according to the present application in the case that Gaussian probability is greater than or equal to a predetermined threshold.
Figure 3:
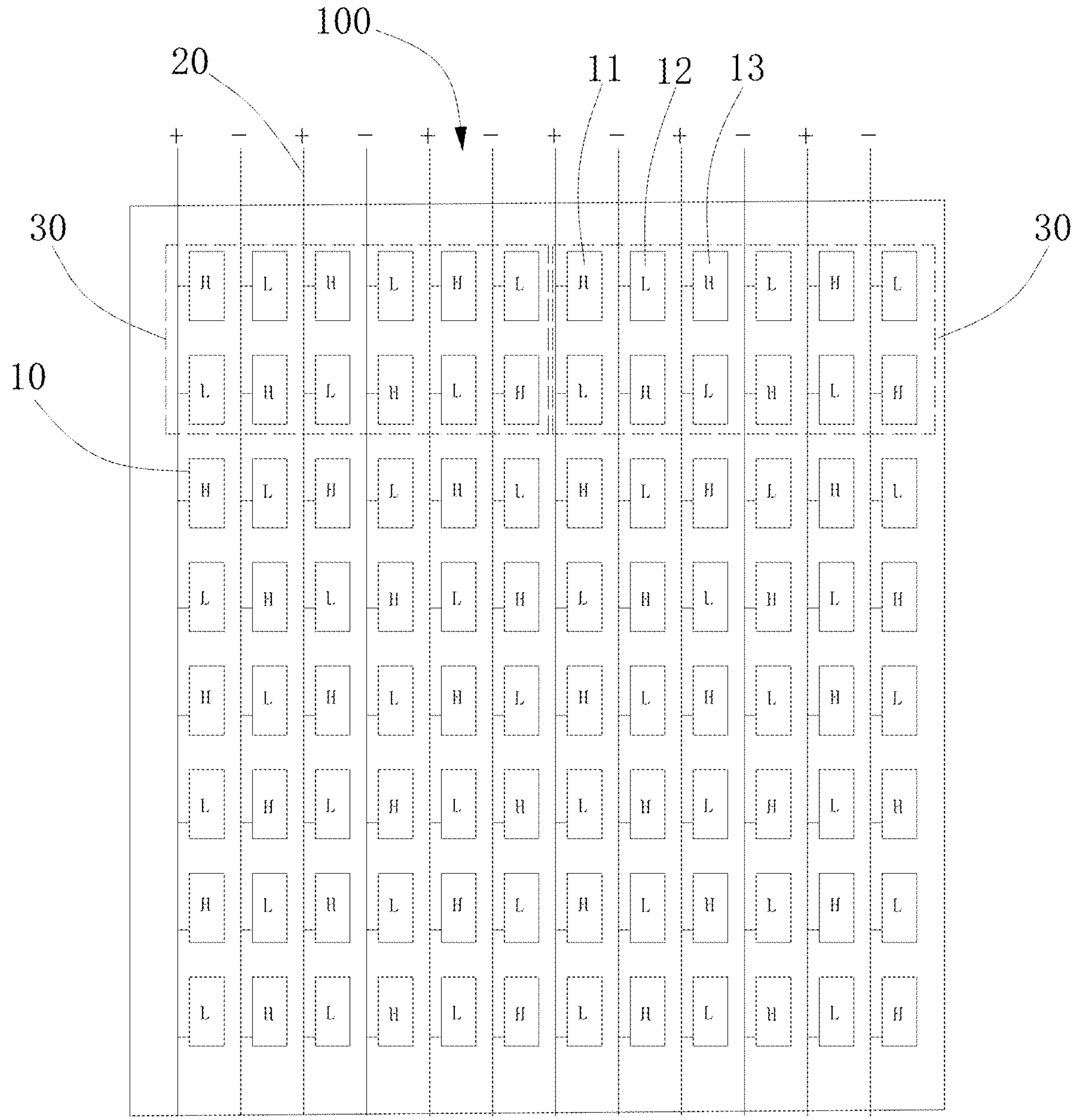
FIG. 3 is a schematic diagram illustrating a first structure of a display device according to the present application in the case that Gaussian probability is less than a predetermined threshold.

Please refer to FIGS. 1 to 3. FIG. 1 is a flowchart of a display driving method for a display device 100 according to a first embodiment of the present application. FIG. 2 is a schematic diagram illustrating a first structure of a display device 100 according to the present application in the case that Gaussian probability is greater than or equal to a predetermined threshold. FIG. 3 is a schematic diagram illustrating a first structure of a display device 100 according to the present application in the case that Gaussian probability is less than a predetermined threshold. The present application provides a display driving method for a display device 100. The display device includes:

a plurality of sub-pixels 10 arranged in an array;

a plurality of data lines 20, each column of the sub-pixels 10 corresponding to and connecting to one data line 20, and adjacent data lines 20 having one column of the sub-pixels disposed therebetween; and a plurality of grayscale pixel groups 30, each of the grayscale pixel groups 30 including sub-pixels 10 of a 2N×3M matrix.

The display driving method includes the following steps:

S10: obtaining a first to-be-processed chroma dataset and a second to-be-processed chroma dataset of a preset scene in a to-be-displayed image with respect to a preset color;

S20: obtaining Gaussian probability of the preset scene in the to-be-displayed image with respect to the preset color according to the first to-be-processed chroma dataset and the second to-be-processed chroma dataset; and S30: when the Gaussian probability is greater than or equal to a predetermined threshold, setting polarities of the sub-pixels 10 in adjacent columns of each grayscale pixel group 30 to be opposite to each other, setting the polarities of the sub-pixels 10 adjacent to the grayscale pixel group 30 in a row direction to be symmetrical to the polarities of the sub-pixels 10 of the grayscale pixel group 30, and then displaying the to-be-displayed image;

when the Gaussian probability is less than the predetermined threshold, setting the polarities of the sub-pixels 10 in adjacent columns to be opposite to each other, and then displaying the to-be-displayed image.

Please refer to FIG. 2, which is a schematic diagram illustrating a first structure of the display device of the present application in the case that the Gaussian probability is greater than or equal to the predetermined threshold. Specifically, when the Gaussian probability is greater than or equal to the predetermined threshold, the polarities of the sub-pixels 10 in adjacent columns of each grayscale pixel group 30 are set to be opposite to each other, and the polarities of the sub-pixels 10 adjacent to the grayscale pixel group 30 in a row direction are set to be symmetrical to the polarities of the sub-pixels 10 of the grayscale pixel group 30, and then the to-be-displayed image is displayed. Since the polarities of the sub-pixels 10 adjacent to the grayscale pixel group 30 in the row direction are set to be symmetrical to the polarities of the sub-pixels 10 of the grayscale pixel group 30, flicker on the screen can be reduced. However, adjacent data lines will have repeated polarities such as "positive, positive" and "negative, negative".

Please refer to FIG. 3, which is a schematic diagram illustrating a first structure of the display device of the present application in the case that the Gaussian probability is less than the predetermined threshold. When the Gaussian probability is less than the predetermined threshold, the polarities of the sub-pixels 10 in adjacent columns are set to be opposite to each other, and then the to-be-displayed image is displayed. That is, in this case, there is no need to perform viewing angle compensation on the to-be-displayed image. The adjacent data lines will not have repeated polarities such as "positive, positive" and "negative, negative". In the case that the Gaussian probability is less than the predetermined threshold, even though the viewing angle compensation is not performed on the to-be-displayed image, the displayed image still has a better viewing angle effect without viewing angle degradation.

The predetermined threshold may be set based on practical image quality requirements of the display device. Taking 8K resolution (e.g., 7680*4320) for example, the values of the predetermined threshold may range from 4727808 to 525472. Specifically, the predetermined threshold may be set as 4976640.

Therefore, by obtaining the Gaussian probability of the preset scene in the to-be-displayed image with respect to the preset color, comparing the Gaussian probability with the predetermined threshold, and determining whether to perform the viewing angle compensation on the to-be-displayed image based on the comparison result, the present application reduces the risk of crosstalk caused by the fact that the voltage drops of the coupling capacitance on the adjacent data lines 20 cannot be canceled each other out.

Please refer to FIG. 2 or FIG. 3. In some embodiments, the sub-pixels 10 in adjacent rows of each grayscale pixel group 30 include high-grayscale sub-pixels and low-grayscale sub-pixels, and the sub-pixels 10 of each grayscale pixel group 30 along a column direction may be arranged in order as high grayscale and low grayscale, or low grayscale and high grayscale. That is, the viewing angle compensation for each grayscale pixel group 30 may be as follows. Suppose that the sub-pixels 10 of adjacent rows include high-grayscale sub-pixels and low-grayscale sub-pixels. Take a 128-grayscale viewing angle compensation for example. Find a pair of high grayscale and low grayscale on a gamma curve, which has brightness matching with the grayscale 128. For example, it is eventually found that the high grayscale is 180 and the low grayscale is 50. This can address the problem of color shift at oblique viewing angles.

Further, each grayscale pixel group 30 includes pixel units, each pixel unit includes a first sub-pixel 11, a second sub-pixel 12 and a third sub-pixel 13, and the sub-pixels 10 of each grayscale pixel group 30 along the row direction include a plurality of pixel units arranged in order. The first sub-pixel 11 is a red sub-pixel, the second sub-pixel 12 is a green sub-pixel, and the third sub-pixel 13 is a blue sub-pixel.

Specifically, in some embodiments, the sub-pixels 10 of each grayscale pixel group 30 along the row direction are arranged in an alternate manner with high grayscale and low grayscale. For example, each grayscale pixel group 30 includes sub-pixels 10 in a 2×6 matrix. The arrangement of the sub-pixels 10 of each grayscale pixel group 30 along the row direction may be as flows: "high grayscale, low grayscale, high grayscale, low grayscale, high grayscale and low grayscale", or "low grayscale, high grayscale, low grayscale, high grayscale, low grayscale and high grayscale".

Figure 4:
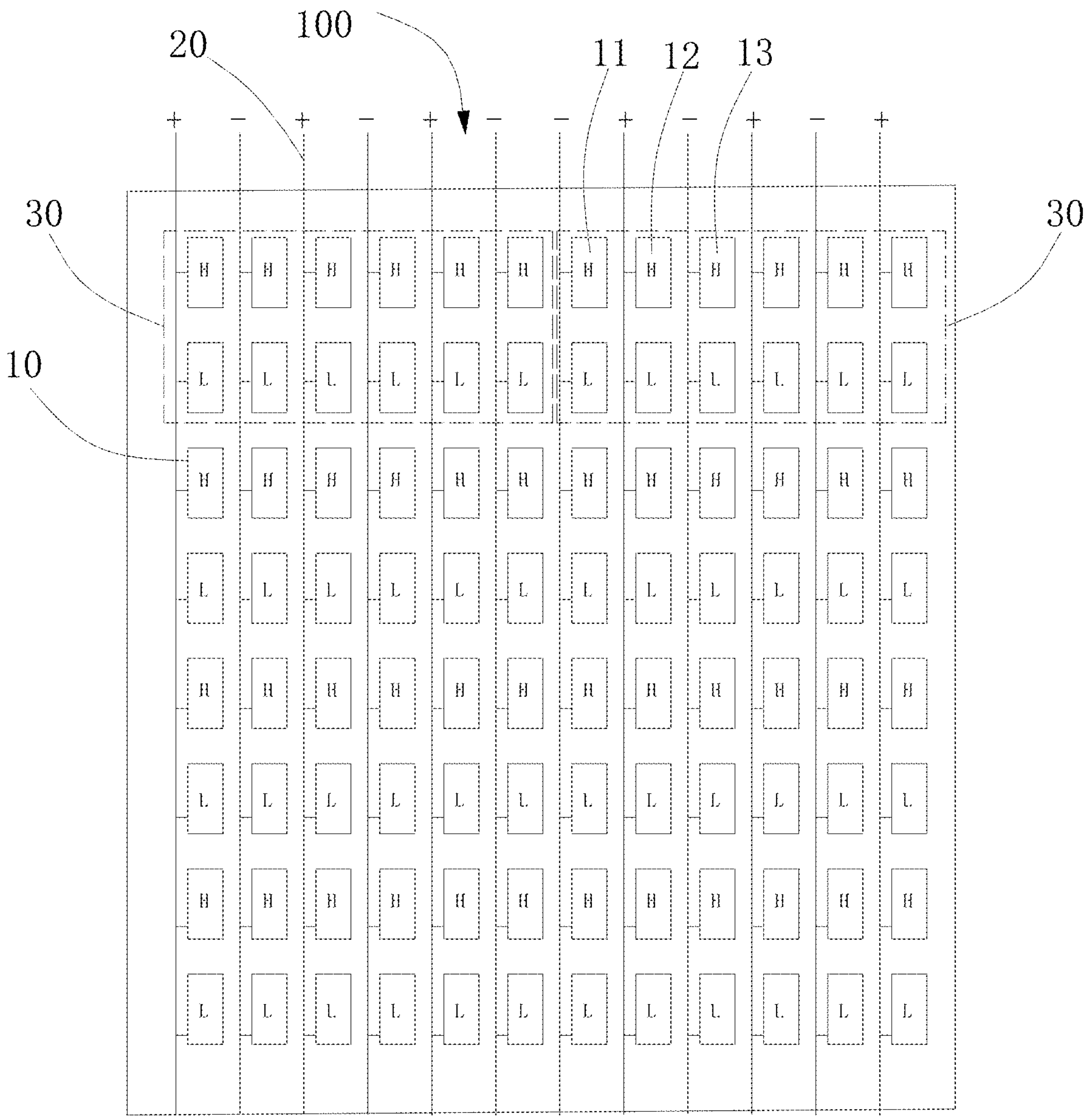
FIG. 4 is a schematic diagram illustrating a second structure of a display device according to the present application.

Please refer to FIG. 4, which is a schematic diagram illustrating a second structure of the display device 100 of the present application. The sub-pixels 10 of each grayscale pixel group 30 along adjacent rows include first row-sub-pixels 10 and second row-sub-pixels 10. The first row-sub-pixels 10 are low-grayscale sub-pixels, and the second row-sub-pixels 10 are high-grayscale sub-pixels. This can also carry out that the sub-pixels 10 of each grayscale pixel group 30 along adjacent rows include high-grayscale sub-pixels and low-grayscale sub-pixels.

Figure 5:
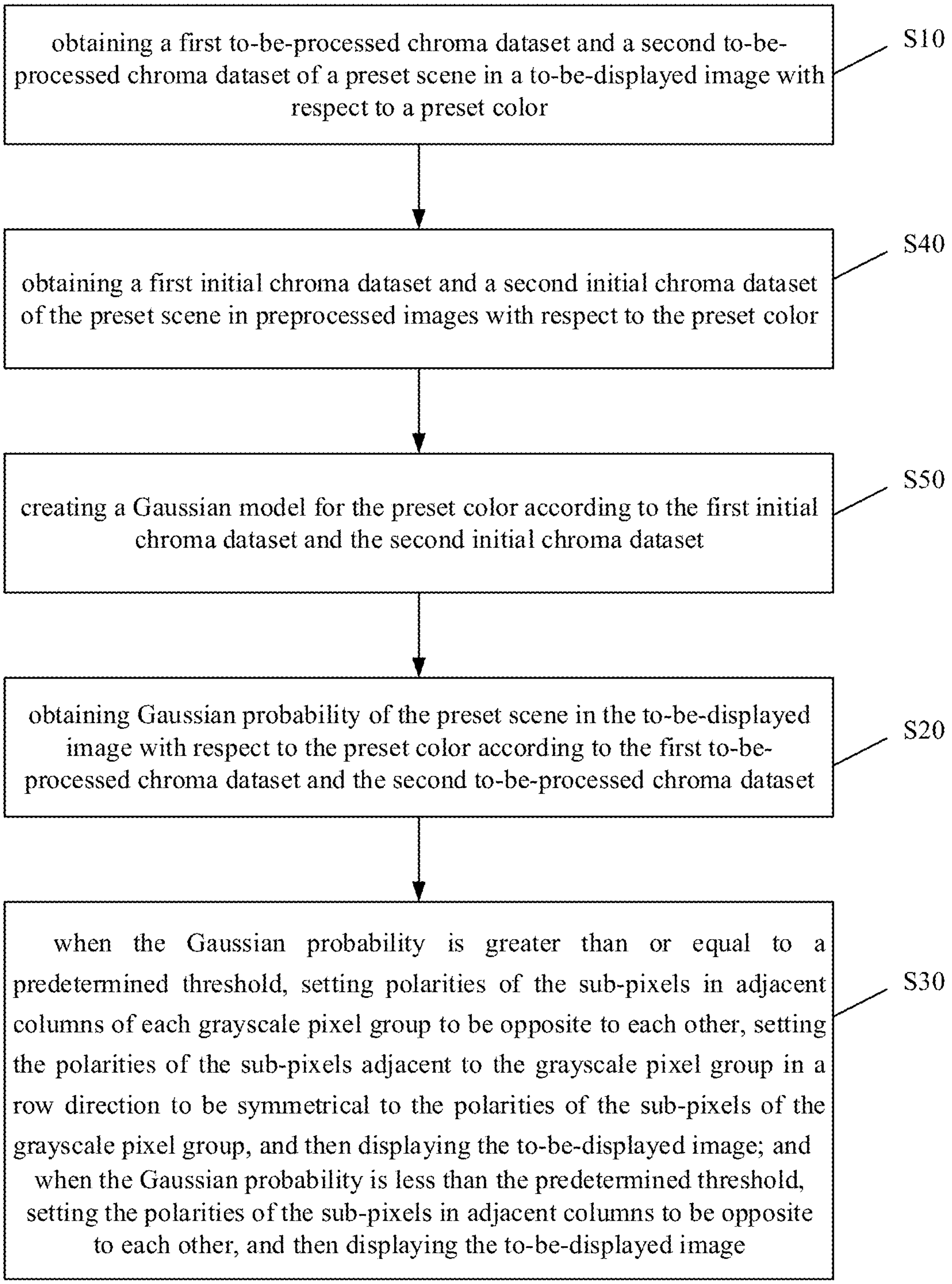
FIG. 5 is a flowchart of a display driving method for a display device according to a second embodiment of the present application.

Please refer to FIG. 5, which is a flowchart of a display driving method for a display device according to a second embodiment of the present application. Before Step S20, the display driving method further includes:

S40: obtaining a first initial chroma dataset and a second initial chroma dataset of the preset scene in preprocessed images with respect to the preset color; and S50: creating a Gaussian model for the preset color according to the first initial chroma dataset and the second initial chroma dataset.

Step S20 includes:

obtaining the Gaussian probability of the preset scene in the to-be-displayed image with respect to the preset color from the Gaussian model, according to the first to-be-processed chroma dataset and the second to-be-processed chroma dataset.

Figure 6:
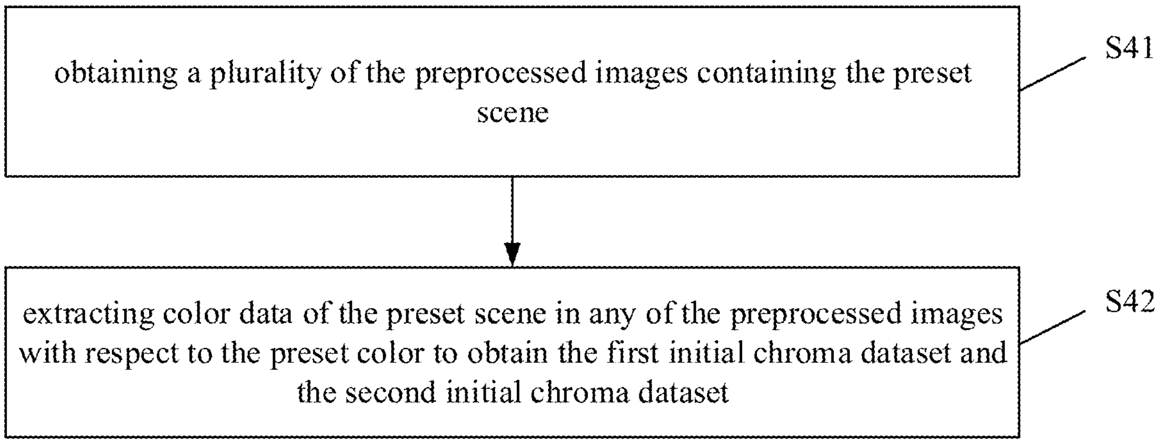
FIG. 6 is a flowchart of Step S40 of the display driving method for the display device according to the second embodiment of the present application.

Please refer to FIG. 6, which is a flowchart of Step S40 of the display driving method for the display device according to the second embodiment of the present application. Further, in some embodiments, Step S40 includes:

S41: obtaining a plurality of the preprocessed images containing the preset scene; and S42: extracting color data of the preset scene in any of the preprocessed images with respect to the preset color to obtain the first initial chroma dataset and the second initial chroma dataset.

Figure 7:
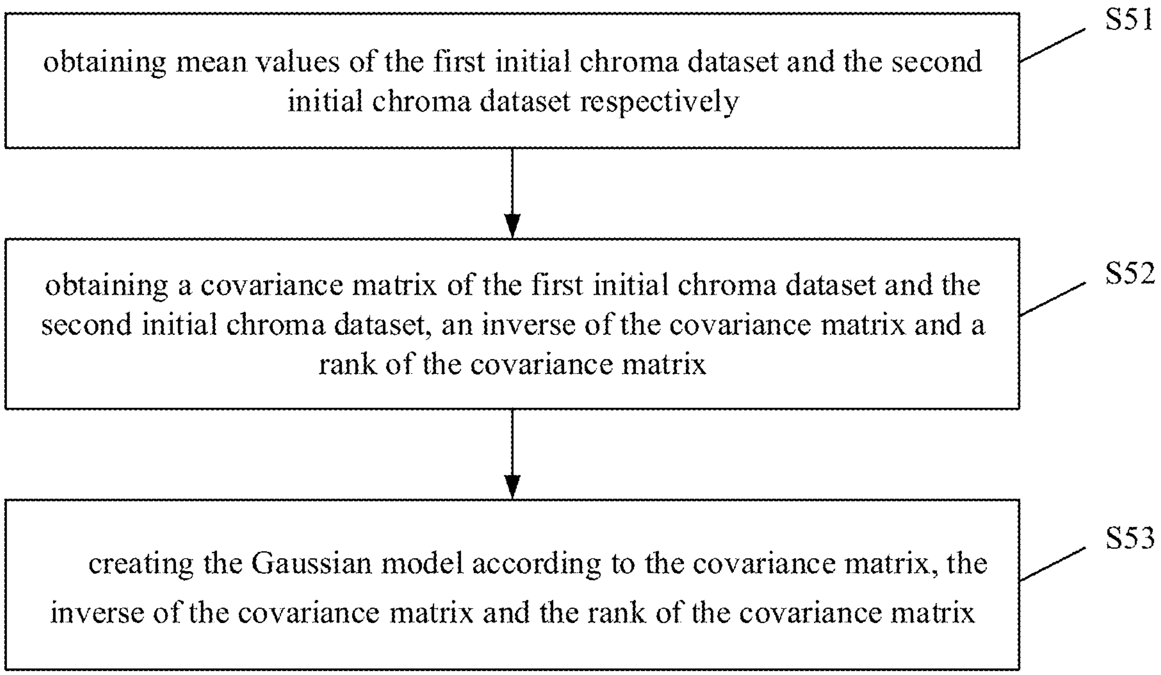
FIG. 7 is a flowchart of Step S50 of the display driving method for the display device according to the second embodiment of the present application.

Please refer to FIG. 7, which is a flowchart of Step S50 of the display driving method for the display device according to the second embodiment of the present application. Further, in some embodiments, Step S50 includes:

S51: obtaining mean values of the first initial chroma dataset and the second initial chroma dataset respectively;

S52: obtaining a covariance matrix of the first initial chroma dataset and the second initial chroma dataset, an inverse of the covariance matrix and a rank of the covariance matrix; and S53: creating the Gaussian model according to the covariance matrix, the inverse of the covariance matrix and the rank of the covariance matrix.

Specifically, in the embodiments of the present application, related data in the to-be-displayed image are processed by the created Gaussian model to obtain the Gaussian probability of the preset scene in the to-be-displayed image with respect to the preset color. In creating the Gaussian model, a plurality of preprocessed images can be selected from a relevant database, and these preprocessed images contain scenes corresponding to the preset scene. The types and the number of preset scenes can be set according to actual needs. In the image processing method in the embodiments of the present application, in creating the Gaussian model, the preset scene can be a portrait, blue sky, grass, food, an animal, any other natural scenery, a building, and etc. The preset color is a corresponding color in each scene.

For example, in the case of a portrait scene, the preset color can be a skin color; in the case of a blue sky scene, the preset color can be a blue color; in the case of a grass scene, the preset color can be a green color.

In the embodiments of the present application, for example, the colors sensitive to human eyes and corresponding scenes are selected for illustrating the creation of the Gaussian model. In the embodiments of the present application, for the portrait, blue sky and grass selected as three preset scenes, their corresponding preset colors are skin color, blue and green, respectively. The following are illustrated by the afore-mentioned three preset scenes and their corresponding preset colors.

A plurality of first preprocessed images containing a preset portrait scene, a plurality of second preprocessed images containing a blue sky preset scene and a plurality of third preprocessed images containing a grass preset scene are selected from a database. The number of preprocessed images containing each of preset scenes may be set depending on various situations.

For any of the first preprocessed images, skin color data are extracted from the first preprocessed image, where a conventional extraction approach may be utilized for the extracting. After obtaining the skin color data of the first preprocessed image, the skin color data can be decomposed in Ycbcr space to obtain luminance data, first initial chroma data and second initial chroma data related to the skin color data.

For the skin color data of a plurality of first preprocessed images, a luminance dataset, a first initial chroma dataset and a second initial chroma dataset related to the skin color data can be obtained. The decomposition of the skin color data can be processed in the Ycbcr space, or in HSB color space. Similarly, the decomposition performed on other preset scenes with respect to other preset colors can be processed in the Ycbcr space, or in other color spaces. The following are illustrated by the processing in the Ycbcr space.

Specifically, the skin color data of the first preprocessed image can be processed using the following formulas:

$$y_{skin(i)}=(R*0.2567+G*0.5041+B*0.0979)+16 \quad (1)$$

$$cb_{skin(i)}=(R*0.1482+G*0.2909+B*0.4391)+128 \quad (2)$$

$$cr_{skin(i)}=(R*0.4392+G*0.3678+B*0.0714)+128 \quad (3)$$

where R, G and B are a red component, a green component and a blue component of the skin color data, respectively, $y_{skin(i)}$ is the luminance data of the skin color data, $Cb_{skin(i)}$ is the first initial chroma data of the skin color data, and $Cr_{skin(i)}$ is the second initial chroma data of the skin color data.

The same processing as above is performed on a plurality of first preprocessed images to obtain a plurality of luminance data $y_{skin}$ to form a luminance dataset, to obtain a plurality of first initial chroma data $cb_{skin}$ to form a first initial chroma dataset $cb_{skin(1)}$, $cb_{skin(2)}$ . . . $cb_{skin(i)}$ . . . , and to obtain a plurality of second initial chroma data $cr_{skin}$ to form a second initial chroma dataset $cr_{skin(1)}$, $Cr_{skin(2)}$ . . . $Cr_{skin(i)}$ . . . .

The mean value of the first initial chroma dataset is calculated to obtain a first chroma mean value $\mu_{skin1}$ of as the skin color data; the variance $a_{skin2}$ of the first initial chroma dataset for each first initial chroma data with respect to the afore-mentioned first chroma mean value $\mu_{skin1}$ is calculated. The mean value of the second initial chroma dataset is calculated to obtain a second chroma mean value $\mu_{skin2}$ of the skin color data; the variance $d_{skin}$ of the second initial chroma dataset for each second initial chroma data with respect to the afore-mentioned second chroma mean value $\mu_{skin2}$ is calculated.

From the variances $a_{skin}$, $d_{skin}$, the first initial chroma dataset $cb_{skin(1)}$, $cb_{skin(2)}$ . . . $cb_{skin(i)}$, . . . , and the second initial chroma dataset $cr_{skin(1)}$, . . . $cr_{skin(2)}$, . . . $cr_{skin(i)}$, . . . , the covariance matrix coy ($cb_{skin}$, $cr_{skin}$) of the first initial chroma data and the second initial chroma data of the portrait scene with respect to the skin color is obtained, and this is expressed as follows:

$$\mathrm{cov}(cb_{skin}, cr_{skin}) = \begin{bmatrix} a_{skin} & b_{skin} \\ c_{skin} & d_{skin} \end{bmatrix} = E[(cb_{skin(i)} - \mu_{skin1})(cr_{skin(i)} - \mu_{skin2})] \quad (4)$$

where $cb_{skin(i)}$ is the first initial chroma data of any of the first preprocessed images, $cr_{skin(i)}$ is the second initial chroma data of any of the first preprocessed images, $\mu_{skin1}$ is the first chroma mean value of the skin color data of the plurality of first preprocessed images, $\mu_{skin2}$ is the second chroma mean value of the skin color data of the plurality of first preprocessed images, $a_{skin}$ is the variance of the skin color data of the first preprocessed images for each first initial chroma data with respect to the afore-mentioned first chroma mean value $d_{skin}$ is the variance of the skin color data of the first preprocessed images for each second initial chroma data with respect to the afore-mentioned second chroma mean value $\mu_{skin2}$, $b_{skin}$ and $c_{skin}$ are the correlations between the first initial chroma dataset and the skin color of a first preset image and between the second initial chroma dataset and the skin color of the first preset image.

From formula (4), the inverse matrix $\mathrm{cov}^{-1}$ ($cb_{skin}$, $cr_{skin}$) or $\Sigma_{skin}^{-1}$ of cov ($cb_{skin}$, $cr_{skin}$) and the rank $|\Sigma_{skin}|$ of cov ($cb_{skin}$, $cr_{skin}$) can be obtained. From above parameters, a Gaussian model for the portrait scene with respect to the skin color can be created, and this can be expressed as follows:

$$gauss_{skin}(cb_i, cr_i) = A * \frac{1}{(2\pi)^{d_{skin}/2}\left|\sum_{skin}\right|^{1/2}} \exp\left[-\frac{1}{2}((cb_i, cr_i) - \bar{\mu}_{skin})^T \sum_{skin}^{-1}((cb_i, cr_i) - \bar{\mu}_{skin})\right] \quad (5)$$

where A is an amplitude of the Gaussian model in a domain [0, 1], $gauss_{skin}(cb_i, cr_i)$ is initial probability obtained from the Gaussian model for the portrait scene with respect to the skin color, $a_{skin}$ is the variance of the skin color data of the first preprocessed images for each first initial chroma data with respect to the afore-mentioned first chroma mean value $d_{skin}$ is the variance of the skin color data of the first preprocessed images for each second initial chroma data with respect to the afore-mentioned second chroma mean value $\mu_{skin2}$, $Cb_i$ is a first chroma variable related to skin color, $cr_i$ is a second chroma variable related to skin color, $\Sigma_{skin}^{-1}$ is the inverse matrix of coy ($cb_{skin}$, $cr_{skin}$), $|\Sigma_{skin}|$ is the rank of coy ($cb_{skin}$, $cr_{skin}$), and $\bar{\mu}_{skin}$ is the mean value of the first initial chroma dataset and the second initial chroma dataset with respect to the skin color of the first preset image.

Likewise, for any of the second preprocessed images, blue color data are extracted from the second preprocessed image. After obtaining the blue color data of the second preprocessed image, the blue color data can be decomposed in Ycbcr space to obtain luminance data, first initial chroma data and second initial chroma data related to the blue color data. For the blue color data of a plurality of second preprocessed images, a luminance dataset, a first initial chroma dataset and a second initial chroma dataset related to the blue color data can be obtained.

Specifically, the blue color data of the second preprocessed image can be processed using the following formulas:

$$y_{sky(i)}=(R*0.2567+G*0.5041+B*0.0979)+16 \quad (6)$$

$$cb_{sky(i)}=(R*0.1482+G*0.2909+B*0.4391)+128 \quad (7)$$

$$cr_{sky(i)}=(R*0.4392+G*0.3678+B*0.0714)+128 \quad (8)$$

where R, G and B are a red component, a green component and a blue component of the blue color data, respectively, $y_{skin(i)}$ is the luminance data of the blue color data, $cb_{skin(i)}$ is the first initial chroma data of the blue color data, and $cr_{skin(i)}$ is the second initial chroma data of the blue color data.

From above data of the second preprocessed images, the covariance matrix coy ($cb_{sky}$, $cr_{sky}$) of the first initial chroma data and the second initial chroma data of the blue sky scene with respect to the blue color can be obtained, and this is expressed as follows:

$$\mathrm{cov}(cb_{sky}, cr_{sky}) = \begin{bmatrix} a_{sky} & b_{sky} \\ c_{sky} & d_{sky} \end{bmatrix} = E[(cb_{sky(i)} - \mu_{sky1})(cr_{sky(i)} - \mu_{sky2})] \quad (9)$$

$$gauss_{sky}(cb_i, cr_i) = A * \frac{1}{(2\pi)^{d_{sky}/2}|\sum_{sky}|^{1/2}} \exp\left[-\frac{1}{2}((cb_i, cr_i) - \bar{\mu}_{sky})^T \sum\nolimits_{sky}^{-1} ((cb_i, cr_i) - \bar{\mu}_{sky})\right] \quad (10)$$

In above formulas (9) and (10), $cb_{sky(i)}$ is the first initial chroma data of any of the second preprocessed images, $cr_{sky(i)}$ is the second initial chroma data of any of the second preprocessed images, $\mu_{sky1}$ is a first chroma mean value of the blue color data of the plurality of second preprocessed images, $\mu_{sky2}$ is a second chroma mean value of the blue color data of the plurality of second preprocessed images, $a_{sky}$ is the variance of the blue color data of the second preprocessed images for each first initial chroma data with respect to the afore-mentioned first chroma mean value $\mu_{sky1}$, $d_{sky}$ is the variance of the blue color data of the second preprocessed images for each second initial chroma data with respect to the afore-mentioned second chroma mean value $\mu_{sky2}$, $b_{sky}$ and $c_{sky}$ are the correlations between the first initial chroma dataset and the blue color of a second preset image and between the second initial chroma dataset and the blue color of the second preset image; A is an amplitude of the Gaussian model in a domain [0, 1], $gauss_{sky}$ ($cb_i$, $cr_i$) is initial probability obtained from the Gaussian model for the blue sky scene with respect to the blue color, $a_{sky}$ is the variance of the blue color data of the second preprocessed images for each first initial chroma data with respect to the afore-mentioned first chroma mean value $\mu_{sky1}$, $d_{sky}$ is the variance of the blue color data of the second preprocessed images for each second initial chroma data with respect to the afore-mentioned second chroma mean value $\mu_{sky2}$, $cb_i$ is a first chroma variable related to blue color, $cr_i$ is a second chroma variable related to blue color, $\Sigma_{sky}^{-1}$ is the inverse matrix of coy ($cb_{sky}$, $cr_{sky}$), $|\Sigma_{sky}|$ is the rank of coy ($cb_{sky}$, $cr_{sky}$), and $\bar{\mu}_{sky}$ is the mean value of the first initial chroma dataset and the second initial chroma dataset with respect to the blue color of the second preset image.

For any of the third preprocessed images, green color data are extracted from the third preprocessed image. After obtaining the green color data of the third preprocessed image, the green color data can be decomposed in Ycbcr space to obtain luminance data, first initial chroma data and second initial chroma data related to the green color data. For the green color data of a plurality of third preprocessed images, a luminance dataset, a first initial chroma dataset and a second initial chroma dataset related to the green color data can be obtained.

Specifically, the green color data of the third preprocessed image can be processed using the following formulas:

$$y_{grass(i)}=(R*0.2567+G*0.5041+B*0.0979)+16 \quad (11)$$

$$cb_{grass(i)}=(R*0.1482+G*0.2909+B*0.4391)+128 \quad (12)$$

$$cr_{grass(i)}=(R*0.4392+G*0.3678+B*0.0714)+128 \quad (13)$$

where R, G and B are a red component, a green component and a blue component of the green color data, respectively, $y_{skin(i)}$ the luminance data of the green color data, $cb_{skin(i)}$ is the first initial chroma data of the green color data, and $cr_{skin(i)}$ is the second initial chroma data of the green color data.

From above data of the third preprocessed images, the covariance matrix coy ($cb_{grass}$, $cr_{gass}$) of the first initial chroma data and the second initial chroma data of the grass scene with respect to the green color can be obtained, and this is expressed as follows:

$$\mathrm{cov}(cb_{grass}, cr_{grass}) = \begin{bmatrix} a_{grass} & b_{grass} \\ c_{grass} & d_{grass} \end{bmatrix} = E[(cb_{grass(i)} - \mu_{grass1})(cr_{grass(i)} - \mu_{grass2})] \quad (14)$$

$$gauss_{grass}(cb_i, cr_i) = A * \frac{1}{(2\pi)^{d_{grass}/2}|\sum_{grass}|^{1/2}} \exp\left[-\frac{1}{2}((cb_i, cr_i) - \bar{\mu}_{grass})^T \sum\nolimits_{grass}^{-1} ((cb_i, cr_i) - \bar{\mu}_{grass})\right] \quad (15)$$

In above formulas (14) and (15), $cb_{grass(i)}$ is the first initial chroma data of any of the third preprocessed images, $cr_{grass(i)}$ is the second initial chroma data of any of the third preprocessed images, $\mu_{grass1}$ is a first chroma mean value of the green color data of the plurality of third preprocessed images, $\mu_{grass2}$ is a second chroma mean value of the green color data of the plurality of third preprocessed images, $a_{grass}$ is the variance of the green color data of the third preprocessed images for each first initial chroma data with respect to the afore-mentioned first chroma mean value $\mu_{grass1}$, $d_{grass}$ is the variance of the green color data of the third preprocessed images for each second initial chroma data with respect to the afore-mentioned second chroma mean value $\mu_{grass2}$, $b_{grass}$ and $c_{grass}$ are the correlations between the first initial chroma dataset and the green color of a third preset image and between the second initial chroma dataset and the green color of the third preset image; A is an amplitude of the Gaussian model in a domain [0, 1], $gauss_{grass}$ ($cb_i$, $cr_i$) is initial probability obtained from the Gaussian model for the grass scene with respect to the green color, $a_{grass}$ is the variance of the green color data of the third preprocessed images for each first initial chroma data with respect to the afore-mentioned first chroma mean value $\mu_{grass1}$, $d_{grass}$ is the variance of the green color data of the third preprocessed images for each second initial chroma data with respect to the afore-mentioned second chroma mean value $\mu_{grass2}$, $Cb_i$ is a first chroma variable related to green color, $cr_i$ is a second chroma variable related to green color, $\Sigma_{grass}^{-1}$ is the inverse matrix of coy ($cb_{grass}$, $cr_{grass}$), $|\Sigma_{grass}|$ is the rank of coy ($Cb_{grass}$, $cr_{grass}$), and $\overline{\mu}_{grass}$ is the mean value of the first initial chroma dataset and the second initial chroma dataset with respect to the green color of the third preset image.

Using above method to build the Gaussian model can set the types and the number of the preset scenes according to actual needs and set the types and the numbers of the preset colors accordingly. The Gaussian model can be created separately for various preset scenes with respect to each of the preset colors. The composition of the Gaussian model can be flexibly adjusted based on application scenarios, customer needs or image quality requirements, etc. In addition, parameters such as the amplitude of the Gaussian model, the mean value for the preset color in the preprocessed images, and the relevant covariance matrix can be adjusted based on demands, and the parameters can also be adjusted based on precision or other considerations, with great practicality and versatility.

Specifically, in processing the to-be-displayed image, the data of the preset color in the to-be-displayed image is extracted first. For example, when a portrait scene, a blue sky scene and a grass scene in the to-be-displayed image are to be processed, skin color data, blue color data and grass color data in the to-be-displayed image are extracted respectively, and are decomposed in the Ycbcr space respectively, so as to obtain the first to-be-processed chroma dataset and the second to-be-processed chroma dataset related to skin color, the first to-be-processed chroma dataset and the second to-be-processed chroma dataset related to blue color, and the first to-be-processed chroma dataset and the second to-be-processed chroma dataset related to green color.

After the first to-be-processed chroma dataset and the second to-be-processed chroma dataset of each preset color are obtained, chroma data of the first to-be-processed chroma dataset and the second to-be-processed chroma dataset with respect to each preset color can be inputted into the Gaussian model for a corresponding preset color to obtain an initial probability map associated with the preset color.

For example, the chroma data in the first to-be-processed chroma dataset and the second to-be-processed chroma dataset of the skin color are inputted to the afore-mentioned formula (5) so as to obtain an initial probability map associated with the skin color in the to-be-displayed image. Likewise, the chroma data in the first to-be-processed chroma dataset and the second to-be-processed chroma dataset of the blue color are inputted to the afore-mentioned formula (10) so as to obtain an initial probability map associated with the blue color in the to-be-displayed image. The chroma data in the first to-be-processed chroma dataset and the second to-be-processed chroma dataset of the green color are inputted to the afore-mentioned formula (15) so as to obtain an initial probability map associated with the green color in the to-be-displayed image.

Figure 8:
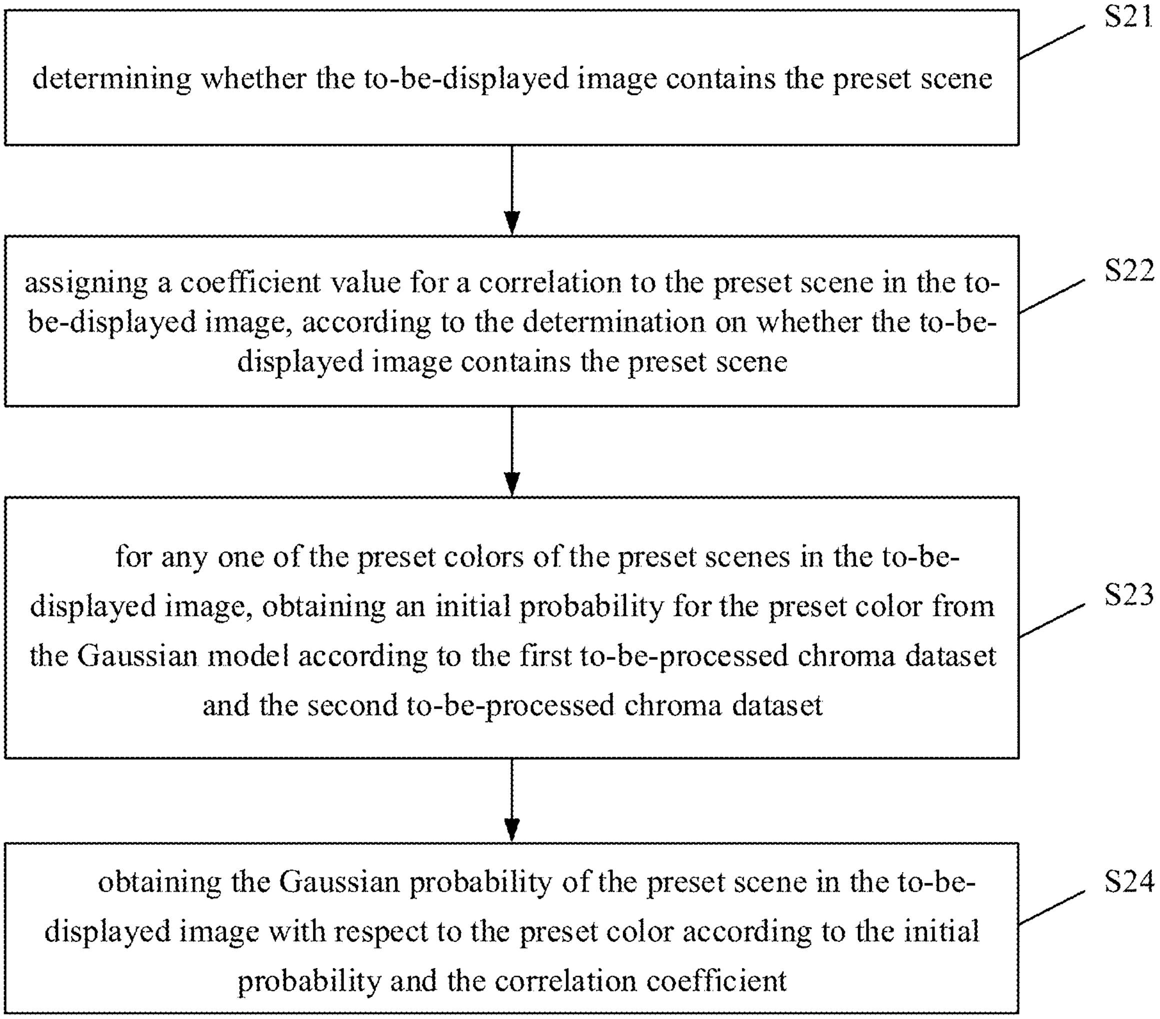
FIG. 8 is a flowchart of Step S20 of the display driving method for the display device according to the second embodiment of the present application.

Please refer to FIG. 8, which is a flowchart of Step S20 of the display driving method for the display device according to the second embodiment of the present application. In some embodiments, Step S20 includes:

S21: determining whether the to-be-displayed image contains the preset scene;

S22: assigning a coefficient value for a correlation to the preset scene in the to-be-displayed image, according to the determination on whether the to-be-displayed image contains the preset scene;

S23: for any one of the preset colors of the preset scenes in the to-be-displayed image, obtaining an initial probability for the preset color from the Gaussian model according to the first to-be-processed chroma dataset and the second to-be-processed chroma dataset;

S24: obtaining the Gaussian probability of the preset scene in the to-be-displayed image with respect to the preset color according to the initial probability and the correlation coefficient.

Further, in some embodiments, there are multiple preset scenes and multiple preset colors.

For any one of the preset scenes, the initial probability of the preset color of the preset scene is corrected using the correlation coefficient.

The Gaussian probability of the multiple preset colors of the multiple preset scenes in the to-be-displayed image is obtained by calculating a sum of the initial probabilities, corrected using the correlation coefficients, of the multiple preset colors of the multiple preset scenes in the to-be-displayed image.

Specifically, in processing the to-be-displayed image, whether the to-be-displayed image contains the preset scene may be determined, and a coefficient value for a correlation to the preset scene is assigned based on a result of the determination. The correlation coefficient of a corresponding preset scene is corrected according to whether the to-be-displayed image contains a preset scene, and thus the Gaussian probability of the preset color of the preset scene obtained according to the Gaussian model can be adjusted. This can not only improve the efficiency of processing the to-be-displayed image but also improve the accuracy of color detection, thereby avoiding false detection of colors in other scenes that are similar to the preset color of the preset scene. In addition, since only the preset color of the preset scene in the to-be-displayed image is processed, this can effectively reduce a perception of image boxes and increase image quality at the time the image is outputted. A conventional approach may be utilized to determine whether the to-be-displayed image contains the preset scene.

Specifically, when multiple preset scenes and corresponding preset colors are set, the overall Gaussian probability of the preset colors of the multiple preset scenes can be obtained from a sum of the initial probabilities corrected by the correlation coefficients of the preset scenes, which can be obtained by the following formula:

$$\mathrm{gauss}(cb,cr)=a^*\mathrm{gauss}_{skin}(cb_i,cr_i)+\beta^*\mathrm{gauss}_{sky}(Cb_i,cr_i)+\gamma^*\mathrm{gauss}_{grass}(cb_i,cr_i) \quad (16)$$

In this formula, gauss (cb, cr) is the Gaussian probability of the preset colors of the preset scenes in the to-be-displayed image, a is the correlation coefficient of the portrait scene in the to-be-displayed image, $\mathrm{gausss}_{skin}$ ($cb_i$, $cr_i$) is the initial probability related to the skin color obtained using the Gaussian model, β is the correlation coefficient of the blue sky scene in the to-be-displayed image, $\mathrm{gauss}_{sky}$ ($cb_i$, $cr_i$) is the initial probability related to the blue color obtained using the Gaussian model, γ is the correlation coefficient of the grass scene in the to-be-displayed image, $\mathrm{gauss}_{grass}$ ($cb_i$, $cr_i$) is the initial probability related to the green color obtained using the Gaussian model.

When there is no corresponding preset scene in the to-be-displayed image, the corresponding correlation coefficient can be assigned with a value of 0, and then the product of it and the initial probability of the preset color of the preset scene obtained by fitting with the Gaussian model is 0, thereby avoiding false detection of similar colors in the to-be-displayed image.

For example, when the to-be-displayed image contains a portrait scene, the correlation coefficient α associated with the portrait scene is assigned with a value of 1; when there is no portrait scene in the to-be-displayed image, the correlation coefficient α associated with the portrait scene is assigned with a value of 0. Likewise, when the to-be-displayed image contains a blue sky scene, the correlation coefficient β associated with the blue sky scene is assigned with a value of 1; when there is no blue sky scene in the to-be-displayed image, the correlation coefficient β associated with the blue sky scene is assigned with a value of 0. When the to-be-displayed image contains a grass scene, the correlation coefficient γ associated with the grass scene is assigned with a value of 1; when there is no grass scene in the to-be-displayed image, the correlation coefficient γ associated with the grass scene is assigned with a value of 0.

Figure 9:
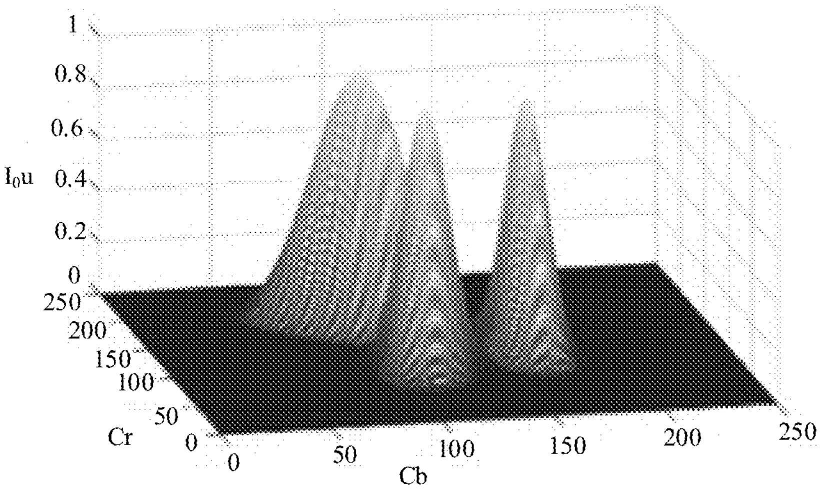
FIG. 9 is a simulation diagram fit with a Gaussian model in a display driving method for a display device according to the present application.
Figure 9:
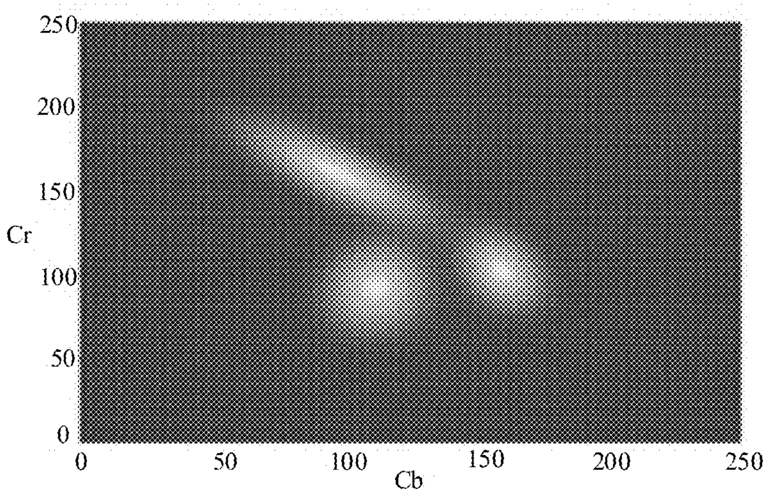

For example, when the to-be-displayed image contains a portrait scene but does not contain a blue sky scene and a grass scene, the resulting Gaussian probability is $gauss(cb, cr)=gauss_{skin}(cb_i, cr_i)$ after the color data of the to-be-displayed image is fitted using the Gaussian model with a correction using the correlation coefficients of corresponding preset scenes, in which the Gaussian fitting probability associated with the blue sky scene and the grass scene is 0. When the to-be-displayed image contains a portrait scene and a blue sky scene and does not contain a grass scene, the resulting Gaussian probability is $gauss(cb, cr)=gauss_{skin}(cb_i, cr_i)+gauss_{sky}(Cb_i, cr_i)$ after the color data of the to-be-displayed image is fitted using the Gaussian model with a correction using the correlation coefficients of corresponding preset scenes. When the to-be-displayed image contains a portrait scene, a blue sky scene and a grass scene at the same time, the resulting Gaussian probability is $gauss(cb, cr=gauss_{skin}(cb_i, cr_i)+gauss_{sky}(cb_i, cr_i)+gauss_{grass}(cb_i, cr_i)$ after the color data of the to-be-displayed image is fitted using the Gaussian model with a correction using the correlation coefficients of corresponding preset scenes. Please refer to portions (a) and (b) in FIG. 9, which are a front view and a top view of a data map implementing the Gaussian fitting model, respectively.

Figure 10:
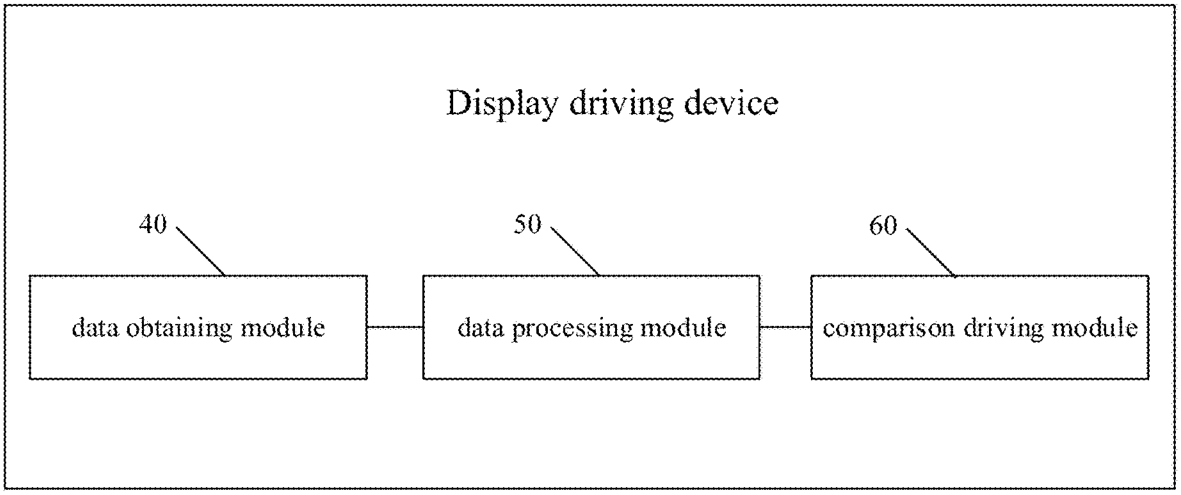
FIG. 10 is a schematic diagram illustrating a display driving device of a display device according to the present application.

Please refer to FIG. 10, which is a schematic diagram illustrating a display driving device of a display device according to the present application. The embodiments of the present application further provide a display driving device of a display device 100. The display device includes: a plurality of sub-pixels 10 arranged in an array;

a plurality of data lines 20, each column of the sub-pixels 10 corresponding to and connecting to one data line 20, and adjacent data lines 20 having one column of the sub-pixels disposed therebetween; and a plurality of grayscale pixel groups 30, each of the grayscale pixel groups 30 including sub-pixels 10 of a 2N×3M matrix.

The display driving device includes:

a data obtaining module 40, configured to obtain a first to-be-processed chroma dataset and a second to-be-processed chroma dataset of a preset scene in a to-be-displayed image with respect to a preset color;

a data processing module 50, configured to obtain Gaussian probability of the preset scene in the to-be-displayed image with respect to the preset color according to the first to-be-processed chroma dataset and the second to-be-processed chroma dataset; and a comparison driving module 60, configured to compare the Gaussian probability with a predetermined threshold, when the Gaussian probability is greater than or equal to the predetermined threshold, set polarities of the sub-pixels 10 in adjacent columns of each grayscale pixel group 30 to be opposite to each other, set the polarities of the sub-pixels 10 adjacent to the grayscale pixel group 30 in a row direction to be symmetrical to the polarities of the sub-pixels 10 of the grayscale pixel group 30, and then display the to-be-displayed image;

when the Gaussian probability is less than the predetermined threshold, set the polarities of the sub-pixels 10 in adjacent columns to be opposite to each other, and then display the to-be-displayed image.

By obtaining the Gaussian probability of the preset scene in the to-be-displayed image with respect to the preset color, comparing the Gaussian probability with the predetermined threshold, and determining whether to perform the viewing angle compensation on the to-be-displayed image based on the comparison result, the present application reduces the risk of crosstalk caused by the fact that the voltage drops of the coupling capacitance on the adjacent data lines 20 cannot be canceled each other out.

The embodiments of the present application further provide a display device 100, including a processor, a storage and a computer program stored in the storage and executable on the processor, wherein the processor executes the computer program to realize the steps of the afore-described display driving method.

Specifically, in the embodiments of the present application, the processor may be a Central Processing Unit (CPU). The processor may also be any other general-purpose processor, a Digital Signal Processor (DSP), an Application Specific Integrated Circuit (ASIC), a Field Programmable Gate Arrays (FPGA), or any other Programmable logic device, a discrete gate, a transistor logic device, a discrete hardware component, and the like. A general processor may be a microprocessor or the processor may be any conventional processor or the like. The general-purpose processor may be a microprocessor or the processor may also be any conventional processor, or the like.

Further, it should be understood that the storage in the embodiments of the present application may be a volatile memory or a non-volatile memory, or may include both volatile and non-volatile memory. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM), which is used as an external cache. By way of example, but not a limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DRRAM).

The display driving method and device, and the display device 100 provided in the embodiments of the present application are described in detail above. The principle and implementation of the present application are described herein through specific examples. The description about the embodiments of the present application is merely provided to help understanding the method and core ideas of the present application. In addition, persons of ordinary skill in the art can make variations and modifications to the present application in terms of the specific implementations and application scopes according to the ideas of the present application. Therefore, the content of specification shall not be construed as a limit to the present application.

The invention claimed is:

1. A display driving method for a display device, the display device comprising:

a plurality of sub-pixels arranged in an array;

a plurality of data lines, each column of the sub-pixels corresponding to and connecting to one data line, and adjacent data lines having one column of the sub-pixels disposed therebetween; and a plurality of grayscale pixel groups, each of the grayscale pixel groups comprising sub-pixels 10 of a 2N×3M matrix, where N and M are positive integers, the display driving method comprising the following steps:

obtaining a first to-be-processed chroma dataset and a second to-be-processed chroma dataset of a preset scene in a to-be-displayed image with respect to a preset color;

obtaining Gaussian probability of the preset scene in the to-be-displayed image with respect to the preset color according to the first to-be-processed chroma dataset and the second to-be-processed chroma dataset;

when the Gaussian probability is greater than or equal to a predetermined threshold, setting polarities of the sub-pixels in adjacent columns of each grayscale pixel group to be opposite to each other, setting the polarities of the sub-pixels adjacent to the grayscale pixel group in a row direction to be symmetrical to the polarities of the sub-pixels of the grayscale pixel group, and then displaying the to-be-displayed image; and when the Gaussian probability is less than the predetermined threshold, setting the polarities of the sub-pixels in adjacent columns to be opposite to each other, and then displaying the to-be-displayed image.

2. The display driving method of claim 1, wherein before the step of obtaining the Gaussian probability of the preset scene in the to-be-displayed image with respect to the preset color according to the first to-be-processed chroma dataset and the second to-be-processed chroma dataset, the method further comprises:

obtaining a first initial chroma dataset and a second initial chroma dataset of the preset scene in preprocessed images with respect to the preset color; and creating a Gaussian model for the preset color according to the first initial chroma dataset and the second initial chroma dataset, wherein the step of obtaining the Gaussian probability of the preset scene in the to-be-displayed image with respect to the preset color according to the first to-be-processed chroma dataset and the second to-be-processed chroma dataset comprises:

obtaining the Gaussian probability of the preset scene in the to-be-displayed image with respect to the preset color from the Gaussian model, according to the first to-be-processed chroma dataset and the second to-be-processed chroma dataset.

3. The display driving method of claim 2, wherein the step of obtaining the first initial chroma dataset and the second initial chroma dataset of the preset scene in the preprocessed images with respect to the preset color comprises:

obtaining a plurality of the preprocessed images containing the preset scene; and extracting color data of the preset scene in any of the preprocessed images with respect to the preset color to obtain the first initial chroma dataset and the second initial chroma dataset.

4. The display driving method of claim 2, wherein the step of creating the Gaussian model for the preset color according to the first initial chroma dataset and the second initial chroma dataset comprises:

obtaining mean values of the first initial chroma dataset and the second initial chroma dataset respectively;

obtaining a covariance matrix of the first initial chroma dataset and the second initial chroma dataset, an inverse of the covariance matrix and a rank of the covariance matrix; and creating the Gaussian model according to the covariance matrix, the inverse of the covariance matrix and the rank of the covariance matrix.

5. The display driving method of claim 2, wherein the step of obtaining the Gaussian probability of the preset scene in the to-be-displayed image with respect to the preset color from the Gaussian model, according to the first to-be-processed chroma dataset and the second to-be-processed chroma dataset comprises:

determining whether the to-be-displayed image contains the preset scene;

assigning a coefficient value for a correlation to the preset scene in the to-be-displayed image, according to the determination on whether the to-be-displayed image contains the preset scene;

for any one of the preset colors of the preset scenes in the to-be-displayed image, obtaining an initial probability for the preset color from the Gaussian model according to the first to-be-processed chroma dataset and the second to-be-processed chroma dataset;

obtaining the Gaussian probability of the preset scene in the to-be-displayed image with respect to the preset color according to the initial probability and the correlation coefficient.

6. The display driving method of claim 5, wherein there are multiple preset scenes and multiple preset colors, wherein for any one of the preset scenes, the initial probability of the preset color of the preset scene is corrected using the correlation coefficient, wherein the Gaussian probability of the multiple preset colors of the multiple preset scenes in the to-be-displayed image is obtained by calculating a sum of the initial probabilities, corrected using the correlation coefficients, of the multiple preset colors of the multiple preset scenes in the to-be-displayed image.

7. The display driving method of claim 1, wherein the sub-pixels of adjacent rows of each grayscale pixel group comprises high-grayscale sub-pixels and low-grayscale sub-pixels.

8. The display driving method of claim 7, wherein the sub-pixels of each grayscale pixel group along a row direction are arranged in an alternate manner with high grayscale and low grayscale.

9. The display driving method of claim 7, wherein the sub-pixels of each grayscale pixel group along adjacent rows comprise first row-sub-pixels and second row-sub-pixels, and the first row-sub-pixels are low-grayscale sub-pixels, and the second row-sub-pixels are high-grayscale sub-pixels.

10. The display driving method of claim 7, wherein each grayscale pixel group comprises sub-pixels in a 2×6 matrix and an arrangement of the sub-pixels of each grayscale pixel group along a row direction is as flows: "high grayscale, low grayscale, high grayscale, low grayscale, high grayscale and low grayscale".

11. A display driving device for a display device, the display device comprising:

a plurality of sub-pixels arranged in an array;

a plurality of data lines, each column of the sub-pixels corresponding to and connecting to one data line, and adjacent data lines having one column of the sub-pixels disposed therebetween; and a plurality of grayscale pixel groups, each of the grayscale pixel groups comprising sub-pixels 10 of a 2N×3M matrix, where N and M are positive integers, the display driving device comprising:

a data obtaining module, configured to obtain a first to-be-processed chroma dataset and a second to-be-processed chroma dataset of a preset scene in a to-be-displayed image with respect to a preset color;

a data processing module, configured to obtain Gaussian probability of the preset scene in the to-be-displayed image with respect to the preset color according to the first to-be-processed chroma dataset and the second to-be-processed chroma dataset; and a comparison driving module, configured to compare the Gaussian probability with a predetermined threshold, when the Gaussian probability is greater than or equal to the predetermined threshold, set polarities of the sub-pixels in adjacent columns of each grayscale pixel group to be opposite to each other, set the polarities of the sub-pixels adjacent to the grayscale pixel group in a row direction to be symmetrical to the polarities of the sub-pixels of the grayscale pixel group, and then display the to-be-displayed image;

when the Gaussian probability is less than the predetermined threshold, set the polarities of the sub-pixels in adjacent columns to be opposite to each other, and then display the to-be-displayed image.

12. A display device, comprising a processor, a storage and a computer program stored in the storage and executable on the processor, wherein the processor executes the computer program to implement steps of a display driving method for the display device, the display device comprising:

a plurality of sub-pixels arranged in an array;

a plurality of data lines, each column of the sub-pixels corresponding to and connecting to one data line, and adjacent data lines having one column of the sub-pixels disposed therebetween; and a plurality of grayscale pixel groups, each of the grayscale pixel groups comprising sub-pixels 10 of a 2N×3M matrix, where N and M are positive integers, the display driving method comprising the following steps:

obtaining a first to-be-processed chroma dataset and a second to-be-processed chroma dataset of a preset scene in a to-be-displayed image with respect to a preset color;

obtaining Gaussian probability of the preset scene in the to-be-displayed image with respect to the preset color according to the first to-be-processed chroma dataset and the second to-be-processed chroma dataset;

when the Gaussian probability is greater than or equal to a predetermined threshold, setting polarities of the sub-pixels in adjacent columns of each grayscale pixel group to be opposite to each other, setting the polarities of the sub-pixels adjacent to the grayscale pixel group in a row direction to be symmetrical to the polarities of the sub-pixels of the grayscale pixel group, and then displaying the to-be-displayed image; and when the Gaussian probability is less than the predetermined threshold, setting the polarities of the sub-pixels in adjacent columns to be opposite to each other, and then displaying the to-be-displayed image.

13. The display device of claim 12, wherein before the step of obtaining the Gaussian probability of the preset scene in the to-be-displayed image with respect to the preset color according to the first to-be-processed chroma dataset and the second to-be-processed chroma dataset, the method further comprises:

obtaining a first initial chroma dataset and a second initial chroma dataset of the preset scene in preprocessed images with respect to the preset color; and creating a Gaussian model for the preset color according to the first initial chroma dataset and the second initial chroma dataset, wherein the step of obtaining the Gaussian probability of the preset scene in the to-be-displayed image with respect to the preset color according to the first to-be-processed chroma dataset and the second to-be-processed chroma dataset comprises:

obtaining the Gaussian probability of the preset scene in the to-be-displayed image with respect to the preset color from the Gaussian model, according to the first to-be-processed chroma dataset and the second to-be-processed chroma dataset.

14. The display device of claim 13, wherein the step of obtaining the first initial chroma dataset and the second initial chroma dataset of the preset scene in the preprocessed images with respect to the preset color comprises:

obtaining a plurality of the preprocessed images containing the preset scene; and extracting color data of the preset scene in any of the preprocessed images with respect to the preset color to obtain the first initial chroma dataset and the second initial chroma dataset.

15. The display device of claim 13, wherein the step of creating the Gaussian model for the preset color according to the first initial chroma dataset and the second initial chroma dataset comprises:

obtaining mean values of the first initial chroma dataset and the second initial chroma dataset respectively;

obtaining a covariance matrix of the first initial chroma dataset and the second initial chroma dataset, an inverse of the covariance matrix and a rank of the covariance matrix; and creating the Gaussian model according to the covariance matrix, the inverse of the covariance matrix and the rank of the covariance matrix.

16. The display device of claim 13, wherein the step of obtaining the Gaussian probability of the preset scene in the to-be-displayed image with respect to the preset color from the Gaussian model, according to the first to-be-processed chroma dataset and the second to-be-processed chroma dataset comprises:

determining whether the to-be-displayed image contains the preset scene;

assigning a coefficient value for a correlation to the preset scene in the to-be-displayed image, according to the determination on whether the to-be-displayed image contains the preset scene;

for any one of the preset colors of the preset scenes in the to-be-displayed image, obtaining an initial probability for the preset color from the Gaussian model according to the first to-be-processed chroma dataset and the second to-be-processed chroma dataset;

obtaining the Gaussian probability of the preset scene in the to-be-displayed image with respect to the preset color according to the initial probability and the correlation coefficient.

17. The display device of claim 16, wherein there are multiple preset scenes and multiple preset colors, wherein for any one of the preset scenes, the initial probability of the preset color of the preset scene is corrected using the correlation coefficient, wherein the Gaussian probability of the multiple preset colors of the multiple preset scenes in the to-be-displayed image is obtained by calculating a sum of the initial probabilities, corrected using the correlation coefficients, of the multiple preset colors of the multiple preset scenes in the to-be-displayed image.

18. The display device of claim 12, wherein the sub-pixels of adjacent rows of each grayscale pixel group comprises high-grayscale sub-pixels and low-grayscale sub-pixels.

19. The display device of claim 18, wherein the sub-pixels of each grayscale pixel group along a row direction are arranged in an alternate manner with high grayscale and low grayscale.

20. The display device of claim 18, wherein the sub-pixels of each grayscale pixel group along adjacent rows comprise first row-sub-pixels and second row-sub-pixels, and the first row-sub-pixels are low-grayscale sub-pixels, and the second row-sub-pixels are high-grayscale sub-pixels.

* * * * *